United States Patent [19]

Plumb et al.

[11] 4,190,790

[45] Feb. 26, 1980

[54] ISOLATOR CIRCUIT FOR USE WITH FREQUENCY SENSITIVE SWITCHING CIRCUIT

[75] Inventors: John L. Plumb; Sheppard Cohen, both of Danvers; Paul H. Ingalls, Swampscott, all of Mass.

[73] Assignee: GTE Sylvania Incorporated, Stamford, Conn.

[21] Appl. No.: 974,278

[22] Filed: Dec. 29, 1978

[51] Int. Cl.² .................... H04Q 1/45; H05B 41/36

[52] U.S. Cl. .................... 315/313; 315/244; 315/258; 315/294; 340/171 A; 340/310 A

[58] Field of Search .............. 315/228, 244, 258, 294, 315/313; 340/171 R, 171 A, 310 R, 310 A; 307/115

[56] References Cited

U.S. PATENT DOCUMENTS

| | | | |
|---|---|---|---|
| 3,521,267 | 7/1970 | Lester et al. | 340/310 A |
| 3,729,710 | 4/1973 | Sherwin | 340/171 R |
| 3,971,010 | 7/1976 | Foehn | 340/310 R |
| 4,017,845 | 4/1977 | Kilian et al. | 340/310 R |

*Primary Examiner*—Eugene R. LaRoche
*Attorney, Agent, or Firm*—Edward J. Coleman

[57] ABSTRACT

An isolator circuit for use with a switching circuit for energizing a ballasted load in response to a control signal of preselected frequency superimposed on AC power circuits which supply the load. In the switching circuit, a triac is gated to conduct the AC power to the load by a circuit including an impedance element and a series resonant LC network tuned to the frequency of the control signal. The control signal may be one of a plurality of control signals having different frequencies superimposed on the power circuits. The isolator circuit is connected between the traic and the load and comprises a plurality of series connected parallel resonant LC circuits each tuned to block a respective one of the control signals. A series choke blocks spurious signal voltages.

12 Claims, 1 Drawing Figure

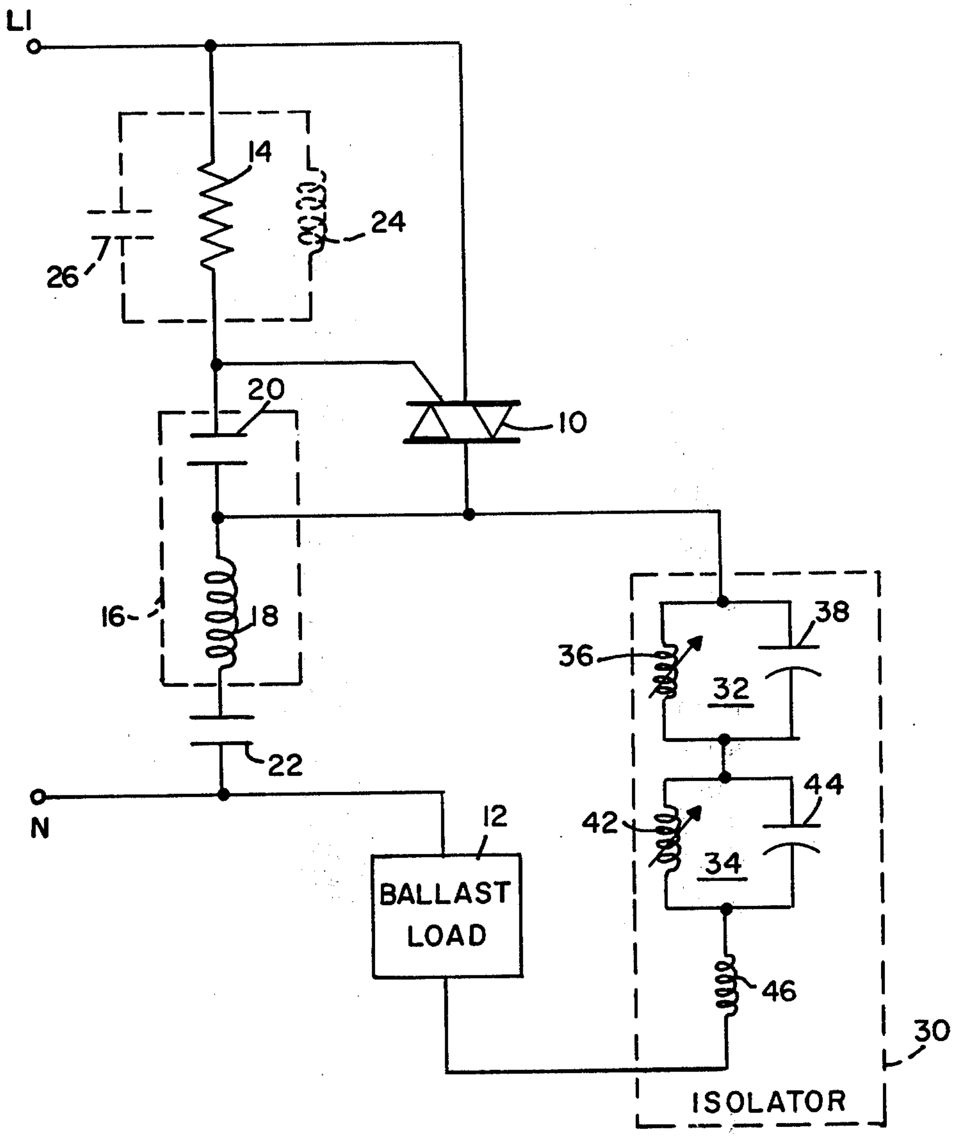
L1
14
24
26
20
10
16
18
22
N
12
BALLAST
LOAD
38
36
32
44
42
34
46
30
ISOLATOR

ISOLATOR CIRCUIT FOR USE WITH FREQUENCY SENSITIVE SWITCHING CIRCUIT

CROSS-REFERENCE TO RELATED PATENT AND APPLICATION

U.S. Pat. No. 3,971,010, issued July 20, 1976, Robert C. Foehn, "Ballasted Load Control System and Methods".

Application Ser. No. 912,606, filed June 5, 1978, Henry T. Hidler and John L. Plumb, "Frequency Sensitive Switching Circuit," assigned the same as this invention.

BACKGROUND OF THE INVENTION

This invention relates generally to electrical control circuits and, more particularly, to an improved power system employing frequency sensitive switching circuits for controlling the energization of loads such as ballasted fluorescent and high intensity discharge lamps.

The above-referenced Foehn patent describes a load control system particularly useful for selectively controlling banks of ballasted lamps in a manner facilitating the implementation of energy conservation measures. More specifically, the system permits the ballasted loads to be selectively disconnected from a power circuit without disturbing other loads connected to the circuit and without substantial modification of existing wiring. Control signals having respective preselected frequencies are applied to the power circuit conductors at a convenient location remotely of the loads. Frequency sensitive switching circuits connect the loads to the conductors, and these switching circuits are actuated in response to the control signals to energize only the desired loads.

Briefly, each of the frequency sensitive switching circuits used in this system comprises a solid state switching device, such as a triac, having first and second main terminals and a control gate for controlling the conductance between the terminals. The first main terminal of the triac is connected to one of the AC power circuit conductors which supply power to the load, while the second main terminal is connected to one side of the load, the other side of the load being connected to the neutral conductor of the AC power circuit. An impedance element, such as a resistor or a parallel resonant circuit, is connected between the control gate and the first main terminal of the triac, and a series resonant circuit adapted to pass the control signal and block the operating power is connected between the control gate and the neutral AC power conductor.

In the absence of a control signal having a frequency at which the series resonant LC circuit is tuned, the gate circuit will not be activated and the triac remains nonconducting. Hence, if the load comprises one or more ballasted fluorescent lamps, the section of light system controlled by this triac switching circuit will remain turned off. In order to energize this section of the lighting system, a remotely located frequency generator is activated to superimpose on the power line conductors a control signal having a frequency matching that to which the above-mentioned LC resonant circuit is tuned. Since the series resonant circuit will pass the control signal, the full control signal appears across the gate-connected impedance element, causing the triac to turn on and energize the load. In order to keep the triac conducting and maintain energization of the load, the gate circuit of this prior art frequency sensitive switch must be continuously activated by the control signal. Once the control signal is terminated, the triac will be turned off, and the load will be de-energized. Hence, although the load control system of the aforementioned Foehn patent represents a significant advance in the art with respect to energy conservation, the advantages of the system could be significantly enhanced if it was not necessary to continuously consume signal power in order to maintain load energization.

The aforementioned application Ser. No. 912,606, Hidler and Plumb, provides an improved frequency sensing switching circuit which significantly reduces the consumption of control signal power in a comparatively simple and economical manner. More specifically, the switching circuit of the Foehn patent is modified as follows. The junction of the capacitor and inductor of the series resonant circuit is connected directly to the triac terminal which is coupled to the load. Further, an additional series capacitor is connected between the resonant circuit inductor and the neutral power circuit conductor. The capacitance value of this additional series capacitor is selected to block the operating power and pass the control signal having a frequency matching that at which the series resonant circuit is tuned. As a result of this circuit modification, the transmitted control signal is developed across the gate impedance means to actuate the triac into conduction at the end of each half cycle of operating power. The resulting conduction of operating power through the switching device is then operative to effectively short out the capacitor component of the series resonant circuit and thereby cause the inductor component of the resonant circuit to block the control signal for the remainder of the operating power half cycle. Hence, the control signal is blocked during all but a small portion of each half cycle of the applied AC power, thereby significantly reducing the consumption of control signal power.

Although the above-described switching circuits provide satisfactory operation in the selective control of conventional ballasted loads, a problem arises when such circuits are employed with lamp ballasts incorporating large capacitors for radio frequency interference (RFI) shunting. If the control signal frequencies (typically in the range of 20 KHz to 90 KHz) are transmitted through such RFI-shunting ballasts, the comparatively large capacitance value of the ballast provides a heavy load on the remotely located signal frequency generator thereby imposing an excessive drain on signal generating power. This excessive loading effect is contrary to the power conserving objectives of the aforementioned circuit of the Hidler and Plumb application, and the control capability of a given signal generator is significantly reduced, i.e., the power drain causes a reduction in the number of switching circuits (and, thus, sections of a lighting system) that a given generator can control. As a result, overall system efficiency is reduced.

SUMMARY OF THE INVENTION

Accordingly, it is an object of the present invention to provide an improved and more efficient load control power system.

It is a particular object of the invention to provide a circuit means and combination for enhancing the efficiency of a power system including control signal operated frequency sensitive switching circuits for controlling the energization of ballasted loads, especially ballasts incorporating RFI shunting.

These and other objects, advantages and features are attained, in accordance with the principles of the present invention, by use of an isolator circuit comprising circuit means tuned to block the one or more control signals of the power system, and means for connecting the tuned circuit means between the frequency sensitive switching circuit and the ballasted load. Preferably, the tuned circuit means of the isolator comprises one or more series connected parallel resonant circuits, each tuned to parallel resonance, and thus maximum impedance, at the frequency of a respective one of the control signals of the system. The means for connecting the one or more parallel resonant circuits to the ballasted load comprises a series choke selected to provide a high impedance for blocking spurious signal voltages having frequencies higher than the frequencies of the control signals.

Accordingly, the isolator circuit of the invention permits the efficient use of control signals superimposed on power circuit conductors in cooperation with associated frequency sensitive switching circuits for controlling the energization of RFI-shunting, ballasted loads. The isolator circuit permits load control of such ballasts with the power conserving switching circuit described in the above-referenced Hidler and Plumb application without the attendant draining of frequency generator power. As a result, the load control capability of the system is maintained or expanded.

BRIEF DESCRIPTION OF THE DRAWING

This invention will be more fully described hereinafter in conjunction with the accompanying drawing, the single FIGURE of which is a circuit diagram of a frequency sensitive switching circuit in combination with an isolator circuit according to the invention.

DESCRIPTION OF PREFERRED EMBODIMENT

The aforementioned U.S. Pat. No. 3,971,010, Foehn, is hereby incorporated herein by reference. As discussed above, this patent describes a load control system including a plurality of control signal sources for selectively imposing control signals of respective preselected frequencies on AC power circuit conductors for controlling the energization of a plurality of ballasted loads such as fluorescent lights. At the interface between each of the loads to be selectively controlled and the AC power line conductors is a frequency sensitive switching circuit. The present invention describes an isolator circuit for use in combination with each frequency sensitive switching circuit for improving the efficiency of the control system described in the Foehn patent, especially when used with RFI-shunting type ballasts.

In the Foehn patent, the overall control system is illustrated in connection with a conventional three phase, four wire power distribution system of the type which is widely used in existing buildings. This system includes phase conductors and a neutral conductor which supply AC power to the building from an external source, typically at a line frequency of 60 Hz and an r.m.s. voltage of up to 600 volts between each of the phase conductors and the neutral conductor. Within the building, power is supplied to the various branch circuits by line conductors (denoted in the patent as L1, L2, L3) and a neutral conductor (denoted in the patent as N) connected to the main phase and neutral conductors at a distribution panel. The system further includes means for applying control signals of predetermined frequency to the conductors of the branch circuits. The specific embodiment illustrated in the patent is a two-channel system having respective control signal sources each operating at a different frequency. Each control signal source includes a frequency generator which operates at a given frequency, preferably in the range of 30 to 70 KHz, although control signal frequencies as low as 20 KHz and as high as 90 KHz are contemplated.

Referring to the drawing, the frequency sensitive switching circuit is the same as that described in the aforementioned copending application Ser. No. 912,606 of Hidler and Plumb and includes a bidirectional switching device, such as a triac 10, having a first main terminal connected to the circuit input terminal denoted L1, a second main terminal coupled to one side of the load 12 through an isolator circuit 30 according to the invention, and a control gate for controlling conductivity between the terminals. The input terminal L1 represents circuit means connected to one of the 60 Hz AC line conductors. A second circuit input terminal, denoted as N, is connected to the other side of load 12 and represents means connected to the neutral conductor of 60 Hz power source. An impedance means, such as resistor 14, is connected between the control gate and the first main terminal of triac 10, and a series resonant circuit 16 is coupled between the triac control gate and the neutral conductor terminals N. Resonant circuit 16 is a series LC network comprising an inductor 18 and a capacitor 20, the capacitor being connected between one side of the inductor and the control gate of triac 10. The values of the LC components 18 and 20 are selected to provide a circuit tuned to resonance at the frequency of a selected one of the previously mentioned control signals which can be superimposed on the 60 Hz power line conductors. The other side of the inductor 18 is coupled to the neutral conductor terminal N through a capacitor 22 which has a capacitance value selected to block the 60 Hz operating power but pass the respective control signal for which circuit 16 is tuned to resonance. The junction of the resonant circuit capacitor 20 and inductor 18 is connected to the second main terminal of the triac 10 which is connected to one side of the isolator circuit 30.

For purposes of discussion, load 12 will be considered as an RFI-shunting lamp ballast. Initially, it is assumed that the line conductors, such as L1, are energized with 60 Hz power and that either there are no control signals uperimposed on the line, or any control signals being generated are those having frequencies different from the frequency at which resonant circuit 16 is tuned. Under these conditions, resonant circuit 16 functions to block the 60 Hz operating power, whereupon triac 10 will remain turned off, and load 12 will remain de-energized.

If a control signal having a frequency corresponding to the tuned resonance of the circuit 16 is applied to line conductor L1, the series circuit 16 and capacitor 22 pass the signal, and the full control signal appears across resistor 14. As a result of the voltage developed on the control gate circuit, triac 10 is caused to turn on and provide full conduction of the 60 Hz operating power to energize load 12. In addition, however, the conducting triac 10 also bypasses the control signal to the junction of inductor 18 and capacitor 20, thereby effectively shorting out capacitor 20 so that circuit 16 no longer resonates at the control signal frequency. Under these conditions, inductor 18 functions as a high impedance to block the control signal. In addition, as previously mentioned, the series capacitor 22 functions to block the 60 Hz operating power when the triac is conducting. When the operating power, and hence the load current, returns to zero at the end of every half cycle of 60 Hz line current, the bypass action of the triac ceases, whereupon capacitor 20 again resonates with inductor 18 at the control signal frequency to permit a voltage build-up across resistor 14. Nearly the full control signal voltage appears across resistor 14. This same voltage appears between the triac control gate and the triac electrode terminal connected to L1, thereby actuating triac 10 into conduction to continue energization of load 12 and again short out capacitor 20 for the remainder of the half cycle of line current.

In summary, the frequency sensitive switching circuit accepts the control signal from the line conductor only long enough to retrigger the triac at the beginning of every half cycle of 60 Hz operating power applied through the triac switch to the load 12. Stated another way, the control signal is developed across resistor 14 and applied to the gate of triac 10 to actuate the same into conduction at the end of each half cycle of operating power and thereafter the conduction of 60 Hz operating power through the triac is operative to effectively short out capacitor 18 to block the control signal for the remainder of the 60 Hz operating power half cycle. Hence, signal power is drawn from the line for only a small fraction of the total time the signal is transmitted, thereby reducing the consumption of control power to a minimum.

In accordance with the present invention, an isolator circuit 30 is connected between the second main terminal of triac 10 and one side of the ballasted load 12. The isolator includes a parallel resonant circuit for each control signal superimposed on the 60 Hz power line conductors, and these one or more parallel resonant circuits are connected in series. For purposes of example, the drawing shows two parallel-resonant LC circuits 32 and 34 connected in series between the triac 10 and load 12. The inductance in each parallel resonant LC circuit is adjusted, and thus the circuit is tuned, to parallel resonance at a respective one of the control signal frequencies applied to the line conductor L1. For example, say that the circuit of the drawing is used in a power system having control signal voltages at 30 KHz and 55 KHz applied to line conductor L1. In this case, inductor 36 and capacitor 38 of circuit 32 would be tuned to parallel resonance at 30 KHz, and inductor 42 and capacitor 44 of circuit 34 would be tuned to parallel resonance at 55 KHz. Accordingly, when triac 10 is actuated into conduction, to 60 Hz operating power will be passed through circuits 32 and 34 and a series choke 46, to be discussed later, in order to energize ballasted load 12. With respect to the control signals on the line, however, the tuning of parallel resonant circuit 32 presents a maximum impedance at 30 KHz to thereby block the control signal at that frequency, and the tuning of circuit 34 presents a maximum impedance at 55 KHz to thereby block the 55 KHz control signal.

The circuit further includes a series-connected choke 46 which passes the 60 Hz operating power but is selected to present a high impedance to high frequency spurious signal voltages on the power line that could cause false triggering of the triac. Choke 46 also blocks high frequency spurious signal currents that can flow when the triac in the receiver switches on. In the present example, the choke is selected to block spurious signal voltages, or transients, having frequencies above about 100 KHz. The inductors 36 and 42 and choke 46 must be sufficiently large to carry the load currents.

The selectivity of the frequency switching circuit can be improved by connecting a parallel resonant circuit between the triac control electrode and the terminal of the triac connected to L1, in lieu of the single resistor 14. This may be accomplished, as illustrated by dashed lines in the drawing, by connecting an inductor 24 and a capacitor 26 in parallel across the resistor 14. This parallel resonant circuit is tuned to resonance at the desired control signal frequency, that is, the same frequency at which the series resonant circuit is tuned.

Assuming preselected values for inductor 18 and capacitor 22, the illustrated switching circuit can be made to operate at various control signal frequencies by using various capacitance values for capacitor 20. The required signal voltage levels are determined by the choice of resistance for resistor 14.

Although the described circuit can be made using component values in ranges suitable for each particular application, as is well known in the art, the following tables list components values and types for a frequency sensitive switching circuit and isolator circuit combination made in accordance with the present invention. More specifically, the table below provides a circuit for energizing arc lamp ballasts with an operating voltage of 277 volts at 60 Hz in response to a control signal of 10 volts at 30 KHz.

| | |
|---|---|
| Triac 10 | Teccor type Q6008L4 |
| Resistor 14 | 68 ohms, ¼ watt |
| Inductor 18 | 7-9 millihenries, Q ≧ 30 |
| Capacitor 20 | 0.0056 microfarad, 1200 volts DC |
| Capacitor 22 | 0.1 microfarad, 1200 volts DC |

A second implementation of the switching circuit for responding to a 55 KHz control signal comprises the same component values given above with the exception of resistor 14, which has a value of 180 ohms, ¼ watt, and capacitor 20, which has a value of 0.0012 microfarad, 1200 volts DC.

Assuming a power system employing the above-mentioned two control signals at 30 KHz and 55 KHz, the isolator circuit employs the following component values:

| | |
|---|---|
| Inductor 36 | 1-2 millihenries |
| Capacitor 38 | 0.022 microfarad, 200 volts DC |
| Inductor 42 | 1-2 millihenries |
| Capacitor 44 | 0.0056 microfarad, 200 volt DC |
| Choke 46 | 1 millihenry |

In the specific embodiments described, the switching circuit consumes signal power for only about 1/80th of each half cycle period of the line current waveform, i.e., signal power is consumed after the waveform zero crossing for a period of about 100 microseconds during each half cycle period of about 8 milliseconds of the 60 Hz current being conducted through triac 10 to the load 12.

What we claim is:

1. An isolator circuit for use in a power system including a ballasted load, a power circuit comprising first and second electrically energized conductors carrying power for the load, a frequency generator for applying a first control signal to the power circuit remotely of the load, and a frequency sensitive switching circuit coupled between the first conductor and one side of the load for controlling the energization of said ballasted load in response to said first control signal applied to the power circuit, the second side of the load being connected to the second conductor, said isolator circuit comprising, circuit means tuned to block said first control signal, and means for connecting said tuned circuit means between said switching circuit and said one side of the ballasted load.

2. An isolator circuit according to claim 1 wherein said tuned circuit means comprises a parallel resonant circuit tuned to parallel resonance, and thus maximum impedance, at the frequency of said first control signal.

3. An isolator circuit according to claim 2 wherein the means for connecting said tuned circuit means to said ballasted load comprises a series choke selected to provide a high impedance for blocking spurious signal voltages having frequencies above a selected level higher than the frequency of said first control signal.

4. An isolator circuit according to claim 1 wherein said power system further includes a frequency generator for applying a second control signal to the power circuit remotely of the load, and said isolator circuit further includes circuit means tuned to block said second control signal and coupled to said tuned circuit means for blocking the first control signal and said connecting means.

5. An isolator according to claim 4 wherein said tuned circuit means for blocking the first control signal comprises a parallel resonant circuit tuned to parallel resonance, and thus maximum impedance, at the frequency of said first control signal, and said tuned circuit means for blocking the second control signal comprises a parallel resonant circuit tuned to parallel resonance, and thus maximum impedance, at the frequency of said second control signal, said parallel resonant circuits being series connected with one another.

6. An isolator circuit according to claim 5 wherein the frequencies of said first and second control signals are in the range of about 20 KHz to 90 KHz.

7. An isolator circuit according to claim 6 wherein the means for connecting said series connected resonant circuits to said ballasted load comprises a series choke selected to provide a high impedance for blocking spurious signal voltages having frequencies above about 100 KHz.

8. An isolator circuit in combination with a frequency sensitive switching circuit for controlling the energization of a ballasted load in response to a first one of a plurality of control signals imposed on power circuit conductors carrying operating power for the load by frequency generators located remotely of the load, said first control signal having a first frequency, and said operating power being alternately current of a second frequency, each control signal other than the first having a respectively different frequency, said switching circuit comprising:

a bidirectional switching device having first and second main terminals and a control gate for controlling conductance between the terminals;

means for connecting the first main terminal of said switching device to a first one of said power circuit conductors, and means for connecting the second main terminal of said switching device to one side of said ballasted load;

an impedance means connected between the control gate and the first main terminal of said switching device;

a series resonant circuit tuned to pass said first control signal and block the operating power and comprising a first capacitor means and a first inductor means, said first capacitor means being connected between the control gate of said switching device and one side of said first inductor means;

means connecting the junction of said first capacitor means and said first inductor means to the second main terminal of said switching device;

a second capacitor means having one terminal connected to a second side of said first inductor means and having a capacitance value selected to pass said first control signal and block the operating power;

and means for connecting a second terminal of said second capacitor means to both a second side of said ballasted load and a second one of said power circuit conductors, whereby said impedance means, first capacitor means, first inductor means and second capacitor means are serially connected in that order across said first and second power conductors;

said isolator circuit comprising, a plurality of circuit means tuned to block respective ones of said plurality of control signals including the first, and means for connecting said plurality of last-mentioned tuned circuit means between the second main terminal of said switching device and said one side of the ballasted load.

9. An isolator circuit in accordance with claim 8 wherein each of said last-mentioned tuned circuit means comprises a parallel resonant circuit tuned to parallel resonance, and thus maximum impedance, at the frequency of a respective one of said control signals.

10. An isolator circuit according to claim 9 wherein the means for connecting said plurality of parallel-resonant tuned circuits to said ballasted load comprises a series choke selected to provide a high impedance for blocking spurious signal voltages having frequencies above a selected level higher than the frequencies of said plurality of control signals, each of said parallel resonant circuits and said choke being connected in series.

11. An isolator circuit according to claim 10 wherein the frequencies of said plurality of control signals are in the range of about 20 KHz to 90 KHz.

12. An isolator circuit according to claim 11 wherein said series choke is selected to provide a high impedance for blocking spurious signal voltages having frequencies above about 100 KHz.

* * * * *